US009616293B2

(12) United States Patent
Belhassen et al.

(10) Patent No.: US 9,616,293 B2
(45) Date of Patent: Apr. 11, 2017

(54) TRAINING KIT

(71) Applicants: Guy Belhassen, Netanya (IL); Baruch Giloboa, Even Yehuda (IL)

(72) Inventors: Guy Belhassen, Netanya (IL); Baruch Giloboa, Even Yehuda (IL)

( * ) Notice: Subject to any disclaimer, the term of this patent is extended or adjusted under 35 U.S.C. 154(b) by 23 days.

(21) Appl. No.: 14/893,939

(22) PCT Filed: Sep. 20, 2012

(86) PCT No.: PCT/IB2012/054987
§ 371 (c)(1),
(2) Date: Nov. 25, 2015

(87) PCT Pub. No.: WO2013/042060
PCT Pub. Date: Mar. 28, 2013

(65) Prior Publication Data
US 2016/0074708 A1    Mar. 17, 2016

Related U.S. Application Data

(60) Provisional application No. 61/536,591, filed on Sep. 20, 2011.

(51) Int. Cl.
*A63B 69/36* (2006.01)
*A63B 24/00* (2006.01)
(Continued)

(52) U.S. Cl.
CPC ........ *A63B 24/0075* (2013.01); *A43B 1/0027* (2013.01); *A43B 5/02* (2013.01); *A63B 23/0464* (2013.01); *A63B 24/0003* (2013.01); *A63B 24/0021* (2013.01); *A63B 24/0062* (2013.01); *A63B 69/002* (2013.01); *A63B 71/02* (2013.01); *A63B 71/06* (2013.01); *A63C 11/025* (2013.01); *A63C 11/026* (2013.01); *G09B 19/0038* (2013.01); *A63B 2024/0028* (2013.01); *A63B 2024/0056* (2013.01); *A63B 2071/0652* (2013.01); *A63B 2071/0694* (2013.01);
(Continued)

(58) Field of Classification Search
USPC ....... 473/409, 420, 422, 423, 424, 438, 446, 473/471, 506, 569, 572, 576, 595, 604, 473/614
See application file for complete search history.

(56) References Cited

U.S. PATENT DOCUMENTS 3,258,858 A * 7/1966 Cariffe, Jr. ............. A41D 19/00
2/158
3,348,842 A * 10/1967 Stern ........................ A43B 5/18
36/1.5
(Continued)

*Primary Examiner* — Nini Legesse
(74) *Attorney, Agent, or Firm* — Mark M. Friedman

(57) ABSTRACT

A system trains a sport player and includes at least one wearable item to be worn by the sport player, such that the wearable item includes a plurality of colors. Accordingly, each one of the plurality of colors is displayed on a designated portion of the wearable item. The system further includes a plurality of equipment devices. Each one of the equipment devices includes a color that corresponds to one of the plurality of colors displayed on the wearable item. Each equipment device directs the sport player to perform a specific operation, such that the operation is executed with the designated portion of the wearable item.

22 Claims, 5 Drawing Sheets

(51) Int. Cl.
    *A43B 5/02*     (2006.01)
    *A63B 69/00*     (2006.01)
    *A63B 23/04*     (2006.01)
    *A43B 1/00*     (2006.01)
    *A63B 71/02*     (2006.01)
    *A63B 71/06*     (2006.01)
    *G09B 19/00*     (2006.01)
    *A63C 11/02*     (2006.01)

(52) U.S. Cl.
    CPC ....... *A63B 2220/05* (2013.01); *A63B 2220/30* (2013.01); *A63B 2220/40* (2013.01); *A63B 2220/806* (2013.01); *A63B 2225/20* (2013.01); *A63B 2230/06* (2013.01); *A63B 2230/42* (2013.01)

(56) References Cited

U.S. PATENT DOCUMENTS

| | | | | |
|---|---|---|---|---|
| 5,290,043 | A * | 3/1994 | Vidinic | A43B 3/0078 273/371 |
| 5,669,833 | A * | 9/1997 | Stone | A63B 69/002 434/251 |
| 5,947,845 | A * | 9/1999 | Canelas | A43B 5/02 273/DIG. 18 |
| 2007/0219024 | A1* | 9/2007 | Allegre | A63B 69/002 473/422 |
| 2010/0137079 | A1* | 6/2010 | Burke | A63B 24/0003 473/446 |
| 2010/0275463 | A1* | 11/2010 | Gallagher | A43B 5/02 36/133 |
| 2012/0178553 | A1* | 7/2012 | Laird | A63B 69/002 473/446 |

* cited by examiner

TRAINING KIT

BACKGROUND

Technical Field

The present invention relates to systems and methods for training an individual and/or a team in a sport activity. More particularly, the present invention relates to a training kit adapted for developing and improving technical and other skills of team players.

Discussion of the Related Art

Generally, any team sport requires a dedicated coaching staff that can constantly provide proper support and training infrastructure for players and athletes forming a team in a particular sport. In so doing, during training sessions, coaches usually provide directives and feedbacks for the players for maintaining and developing their skills, endurance, and overall performance so that their team ultimately achieves their winning goals, as expected.

More particularly, for achieving reasonable results, team training currently requires that a coach pay close attention to each player throughout a training session. That is, coaches may spend much time on observing single players perform certain required drills in to provide such players with repeated and dedicated instructions for improving the skill of the player and/or even cultivating and developing the player's inherent talent for the sport at hand. Accordingly, absent such close attention and/or supervision, the skills and expertise of team players may become stagnate or even deteriorate to the extent such players may lose their competitive edge.

However, even while providing close supervision and training management, coaches may not have a capacity to provide desired one-on-one instruction for each player equitably. Consequently, this may result in all or some players of a team not receiving the proper instructions they need for achieving their personal, as well, as their team objective. Although coaches and certain players may try to make up for such short comings, the lack of training uniformity may ultimately degrade and hamper the over all performance of the team.

BRIEF SUMMARY

Exemplary embodiments of the present technique disclose a training kit for training a team of players, such a soccer team. Accordingly, the present technique utilizes certain wearable items adapted to be worn by the players of the team during a training session. The wearable item include a pair of soccer shoes, whereby each of the shoes displays three different colors on three different portions of the shoes. In a preferred embodiment, an outer portion of the shoes is colored in one color (e.g., yellow), an inner portion of each of the shoes is colored in another color (e.g., green), and a center portion of each of the shoes is colored, yet, in a different color (e.g., black).

The training kit further includes a plurality of training equipment, including variously shaped devices, such as hoops, cones, domes and sticks, adapted to be placed across a training field, such as a soccer field. Each of the aforementioned devices may be uniformly colored in a color that matches of the color placed on one of the three portions of the soccer shoes. Further, each of the differently shaped devices placed at various portions of filed forms an indication to a to a soccer player to perform a certain physical operation, i.e., kick, run, elevate a soccer ball, and so forth, as part of a training drill. Thus, when used with the shoes worn by the player, the present technique provides a training scheme, whereby the soccer player is directed by each one of the equipment devices to perform the physical operation with a portion of the shoe(s) whose color matches the color of the equipment device. In so doing, the player can be trained to perform a variety of drills and physical operations while utilizing various portions of his feet and shoes to advance a soccer ball across a soccer field. Hence, utilizing the present technique, coaches can form comprehensive workout drills, whereby many players can autonomously perform a variety of soccer drills otherwise requiring close instruction and supervision. Advantageously, such methods are adapted to effectively communicate simultaneously to multiple players the variety of required training drills coaches wish the player to perform.

Other aspect of the present technique may further include a machine readable medium adapted to store code for generating a variety of desired training drills based various inputs related to skills and techniques coaches wish to develop in soccer player. Accordingly, with the use of the above wearable soccer shoes and field equipment devices, the present technique may form a software program adapted for outputting suggested training setups of the equipment devices across the field based inputs specifying skill sets coaching staff whish to focus on. Hence, coaches wishing to develop, for example, the running, kicking and/or passing skills while utilizing both of the player's feet and potions thereof, can be provided by the disclosed software a variety of appropriate setups for optimally achieving the training goal. Such software may further take into account performance and player related information, such as running speed, acceleration, preferred kicking side, player height past performance, success rate, for tailoring a personal training workout for each of team player utilizing the colored shoes and equipment.

Other aspects of the invention may include a system arranged to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
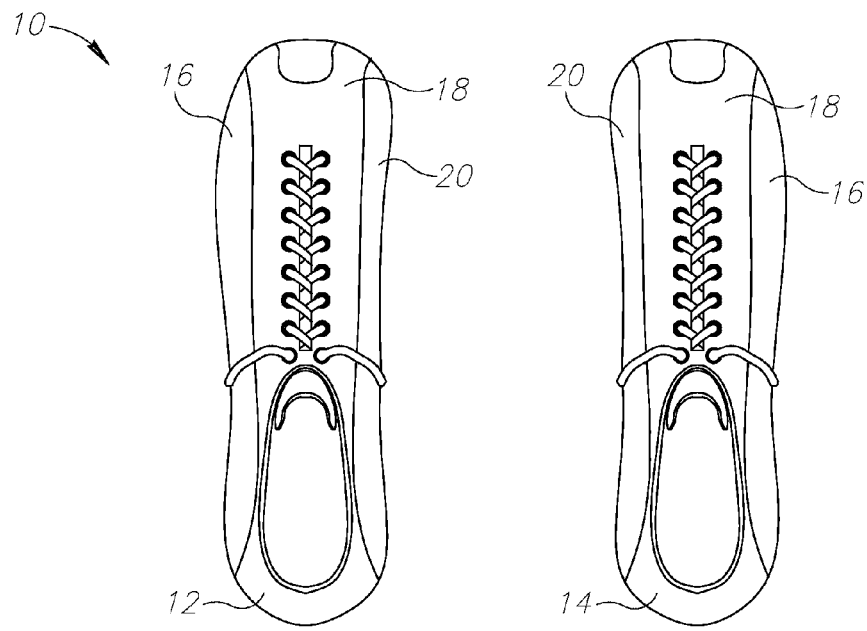
FIG. 1 is a top view of soccer shoes, in accordance with an exemplary embodiment of the present technique.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before explaining at least one embodiment of the present technique in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

Turning now to the Figures, FIG. 1 is a top view of soccer shoes 10, in accordance with an exemplary embodiment of the present technique. The soccer shoes 10 form shoes 12 and 14, respectively, adapted to be worn on a left foot and right foot of a soccer player. The shoes 10 may be adapted for general soccer use and may be formed of various material, such as leather, polyester, synthetic rubber, and/or other durable materials normally used in the fabrication of sports and similar sporting items, as appreciated by those having ordinary skill in the art. Accordingly, the shoes 10 may be fabricated to fit a variety of players having different sizes of feet and/or different shapes. Thus, users, such as soccer players, wearing the shoes 10 may utilize the shoes to perform variety physical operations, drills and exercises generally performed by players as part of a soccer training session. Hence, the shoes 12 may be used by a player for running with, kicking, passing and/or jumping with a soccer ball, over soccer or similar training fields.

As further shown each of the shoes 12 and 14 is partitioned into three portions, i.e., portions 16, 18 and 20, whereby portion 16 forms an out part of the shoes 10, portion 18 form a central part of the shoes 10, and portion 20 form and inner part of the shoes 10. Further, each of the portions 16-20 of the shoes 12 and 14 may be differently colored by a distinct and noticeable color. For example, portion 16 of the shoes 12 and 14 may be uniformly displayed to have a green color, while portion 18 may have uniformly be colored black and portion 20 of the shoes 10 can be uniformly colored as yellow. It should be born in mind that the aforementioned colors of the portions 16-20 is merely exemplary and that each of the portions 16-20 can be differently colored with any available and accessible color of choice. Thus, by further example, portion 16 of the shoes 10 may have a red color, portion 18 a white color, and portion 20 a purple color.

Further, a soccer player wearing the shoes 10 can generally utilize each of the different portions 16-20 of the shoes to handle and/or manipulate a soccer ball while performing various exercises and physical operations, such as walking, running, jumping, passing, kicking and so forth. In fact, as will be described below, each of the portions 16-18 forms part of a training kit and method for enabling the soccer player to utilize the various portions of the player's feet, respectively, associated with the portions 16-20. Hence, a player may perform certain drills focusing on the manipulation of the soccer ball while utilizing only the portion 16 of the player's feet. In so doing, the player may gradually develop proper habits and techniques for utilizing a full range of feet portions, previously not used by the player but, nonetheless, are vital for complementing the player's skills. Similarly, the player may utilize portions 18 and 20 in certain drill and exercises for developing or otherwise improving other soccer playing skills involving usage of those feet portions associated with portions and 20.

Figure 2:
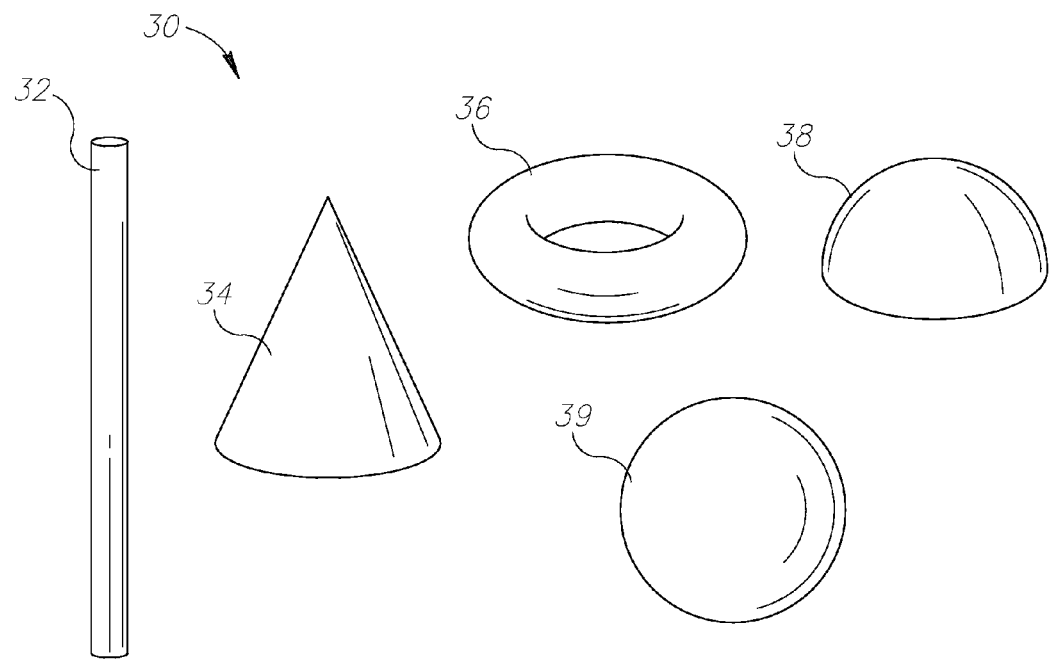
FIG. 2 illustrates a top view of a set of equipment devices, in accordance with and exemplary embodiment of the present technique.

Accordingly, the differently colored portions 16-20 of the shoes 10 may complement other portions of a training kit, including training equipment devices illustrated by FIG. 2, illustrating a top view of a set of equipment devices 30, in accordance with and exemplary embodiment of the present technique. The training devices 30 are made up of blocks/slabs 32, cones 34, hoops, 36 domes 38, and balls 39. The devices 32-38 may generally be made up of plastic, rubber, PVC, light metal, wood, or a combination of the aforementioned materials. It should be borne in mind that although not shown, the disclosed training kit may further include other devices and means, such as shirts, garments, socks, hats and/or other items, all of which may be colored in colors matching the various portions 16-20 of shoes 10.

As disclosed herein, the devices 32-39 may form part of a training kit having a collection multiple copies of each of the devices 32-39. Accordingly, each one of the devices 32-38 and any multiple copies thereof are adapted to be placed across a field, such as a soccer field, for providing indications to the player on performing certain exercises, drills or other physical operations. In addition, each of the devices 32-39 may be painted in a color that matches any of the colors forming the portions 16-20 of the shoes 20. Thus, for example, in one drill or exercise, slab 32 painted in yellow may provide an indication to the player the player should attempt to kick the ball with a certain force or direction with the player's left shoe 12, particularly, with the yellow portion, i.e., 20. In another example, a certain drill may designate a black painted cone 34 as an indication to the player to attempt to kick the ball straight ahead toward a goal keeper, guarding a goal post. Still by further example, a hoop, such as hoop 36, painted in green may provide an indication to the player to manipulate the soccer ball with the green portion (e.g., portion 20) of the shoe 14 as the player rounds in a circle about the hoop 36 in counter clockwise direction. Accordingly, these and other drills, as facilitated by the shoes 10 and the equipment devices 30, enable a soccer player to move, utilize, and flex various feet portions in developing and expanding a multitude of movement skills adapted to improve the overall playing ability of the soccer player.

Figure 3:
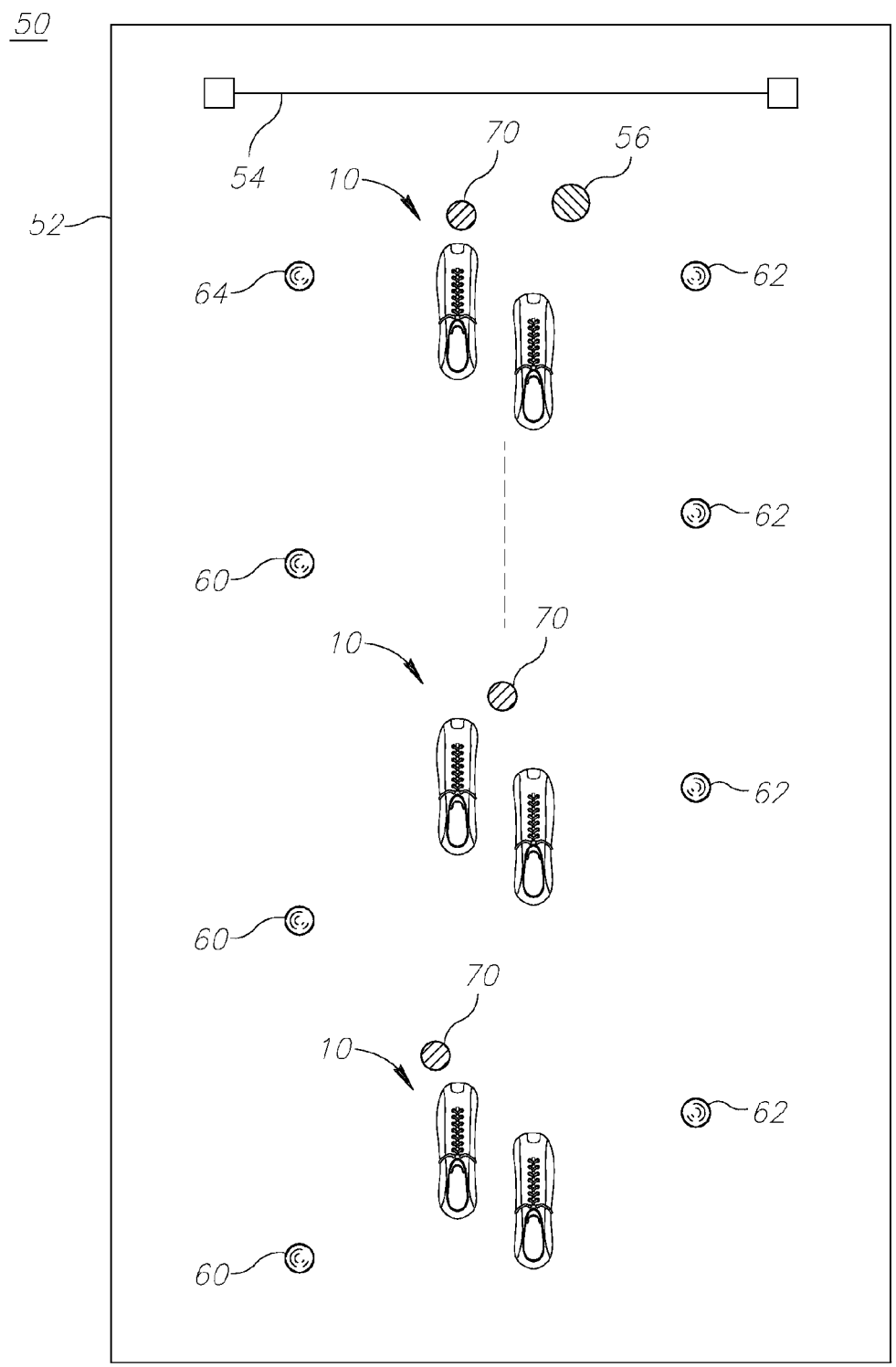
FIG. 3 is a top view of a training set up, in accordance with an exemplary embodiment of the present technique.

FIG. 3 is a top view of a training set up 50, in accordance with an exemplary embodiment of the present technique. The illustrated training set up 50 is laid out across a field 52, i.e., soccer field, where various equipment devices, such as the equipment devices 30, are placed in relation to a soccer goal post 54 and goal keeper 56 guarding the goal post 56. Hence, the set up 50 illustrates a particular drill coaching staff may utilize in training soccer player for developing their running, kicking and other ball manipulation skills across a real soccer field.

Accordingly, in the illustrated embodiment, four green cones 60 and yellow cones 62 are sequentially placed across the field 52 with the a ninth black cone 64 being placed closest to the goal post 54. In one exemplary embodiment, a player wearing the shoes 10 advances a soccer ball 70 in between and through the cones 60 and 62, such that when reaching a green cone 60, the player advances the ball with the green portion 16 of the shoe 12 until the player reached a next yellow cone 62. At that point the yellow cone 62 directs the player to advance the ball with the yellow portion 20 of the shoe 12 until the next green cone 60 and so forth. Accordingly, in the present drill, the player may continue advancing the ball 70 in the aforementioned alternating pattern with show 12 until the player reached the last black cone 64, where that cone directs or invokes the player to use the black portion 18 of the shoe 12 and kick the ball 70 straight ahead toward goal post 54 and guard 56. Those skilled in the art will appreciate the above illustrated drill can be done by the player in a similar matter using the right shoe 14. Hence, as illustrated by FIG. 3, the training kit formed by the shoes 10 equipment 30 forms a self contained training method, whereby a player may be directed to perform certain exercises and drills independently and without an intervention from a coach, or other training staff. Thus, the player may repeatedly and continuously perform such a drill to better develop and expand current and future soccer playing techniques.

Figure 4:
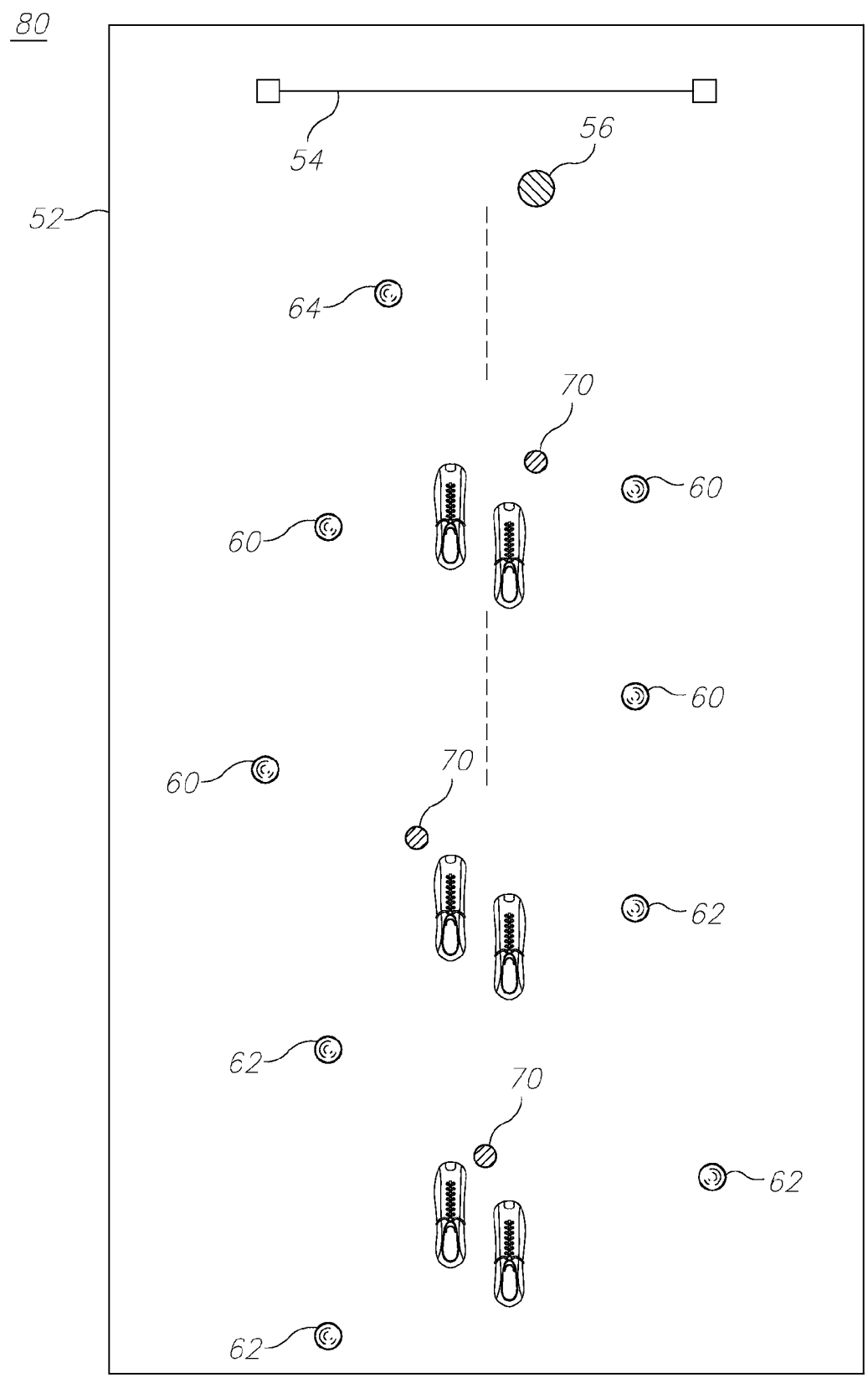
FIG. 4 is a top view of another training set up, in accordance with an exemplary embodiment of the present technique.

By further example, FIG. 4 is a top view of another training set up 80, in accordance with an exemplary embodiment of the present technique. The illustrated set up is over the field 52 in which first four yellow cones 62 are disposed at one end of the field 52, followed by next green cones 60, and finally a last black cone 64 disposed closes to goal post 54 and guard 56. Accordingly, the set up 80 lends itself to a drill in which the initial successive placement of the yellow cones 62 necessitates that the player use both feet, particularly inner yellow portions 20 of the shoes 10, to advance the ball as the player mover across the filed. Once the player reaches green cones 60, those cones direct the player to advance outer portions of the player's feet, i.e., portions 16 of shoes 10, for advancing the ball down the field of where the green cones 60 are placed. Finally, when the player reaches the last black cone 64, the player is directed to kick the ball straight ahead toward the goal post 54. Hence, the object of drills, such as those illustrated by FIGS. 3 and 4, are to self train the soccer player to utilize both sides of the player's feet when advancing the ball down a field, as would happen during an ordinary tournament game.

Figure 5:
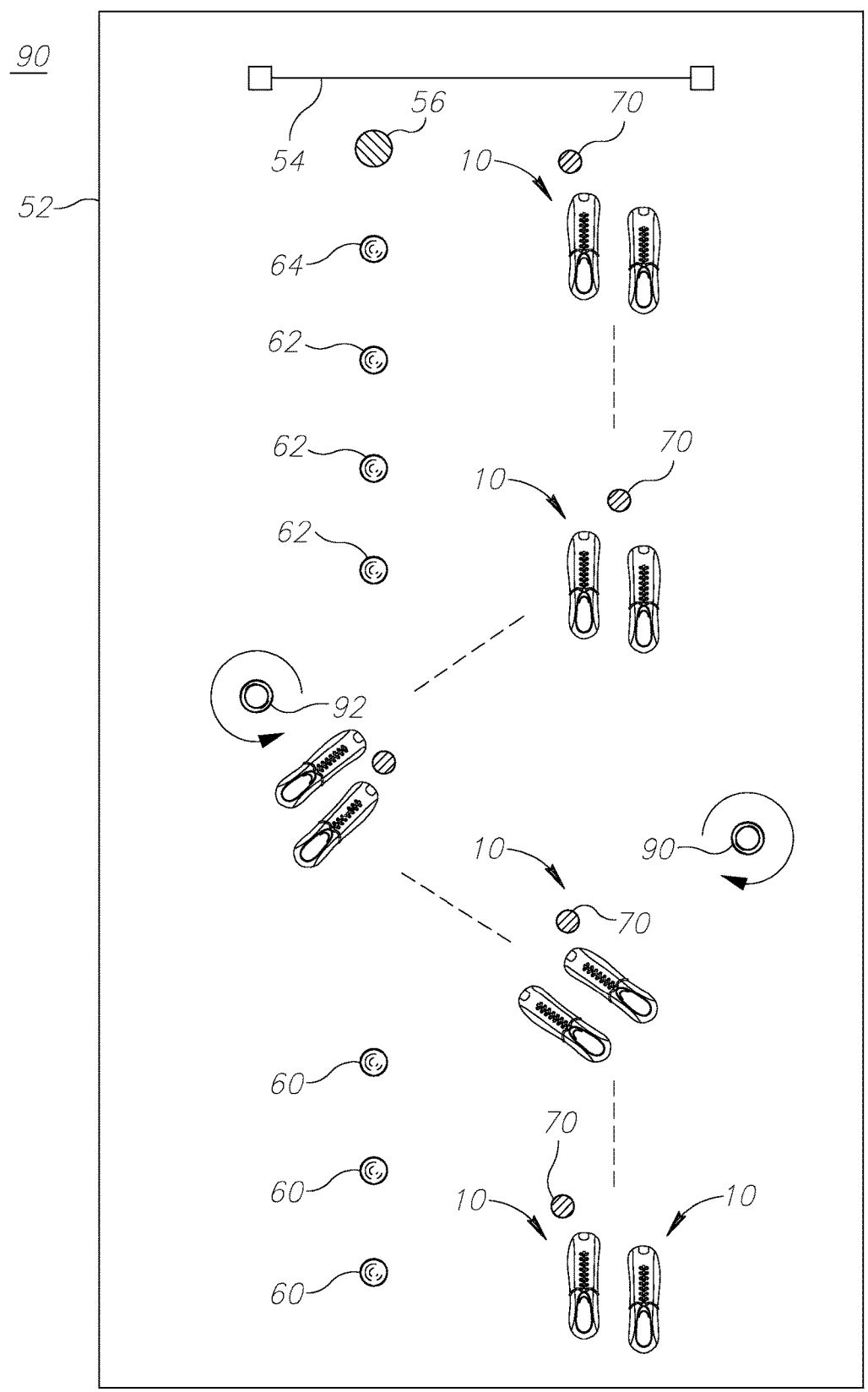
FIG. 5 is a top view of, yet, another set up, in accordance with an exemplary embodiment of the present technique.

Still by further example, FIG. 5 is a top view of, yet, another set up 90, in accordance with an exemplary embodiment of the present technique. Similar to the above set ups, set up 90 places equipment devices 30 across the field 52. Specifically, a player moves past first three green cones 60 in which those cones direct the player to use out portions 16 of shoes 20 for advancing the ball 70 across the filed. Thereafter, when the player reaches yellow hoop 90, that hoop direct the player to round about the hoop in a full circle (clockwise) while using the green portion 16, or in other words, the outer portion of the player's foot to traverse a circle about the hoop 90.

Thereafter, the player advances to another hoop 92 in which that hoop directs the player to round about the hoop 92 using the yellow portions 20 of the shoes 10, that is, to traverse the hoop in full circle (counter clockwise) using the inner portions of the player's feet. Afterwards, the player proceeds to advance the ball across three yellow cones 62, again directing the player to advance the ball forward using portions 20 of the shoes. Finally, the player reached black cone 64, directing the player to kick the ball straight toward goal post 54 using the black portion 18 of one of the shoes 10.

It should be born in mind that the present technique may extend to other exercises and drills in which one or more players take part while using the shoes 10 and equipment 30. In some embodiments, for example, the present technique may be implemented in training set up where a team of players wearing yellow shirts may only use the yellow portion 20 of their shoes 10 to advance a soccer ball against a team wearing green shirts that may only use the green portion 16 of their shoes 10 for advancing the ball. In other exemplary embodiments, a soccer drill may be formed in which a team may train with two different colored soccer balls, i.e., one yellow, one green. In such a set up, coaches may throw the balls to the differently colored balls towards the players, requiring the players to utilize the various shoe portions (16, 20) of the player's shoes 10 whose color matcher the color of the ball thrown at the player.

Figure 6:
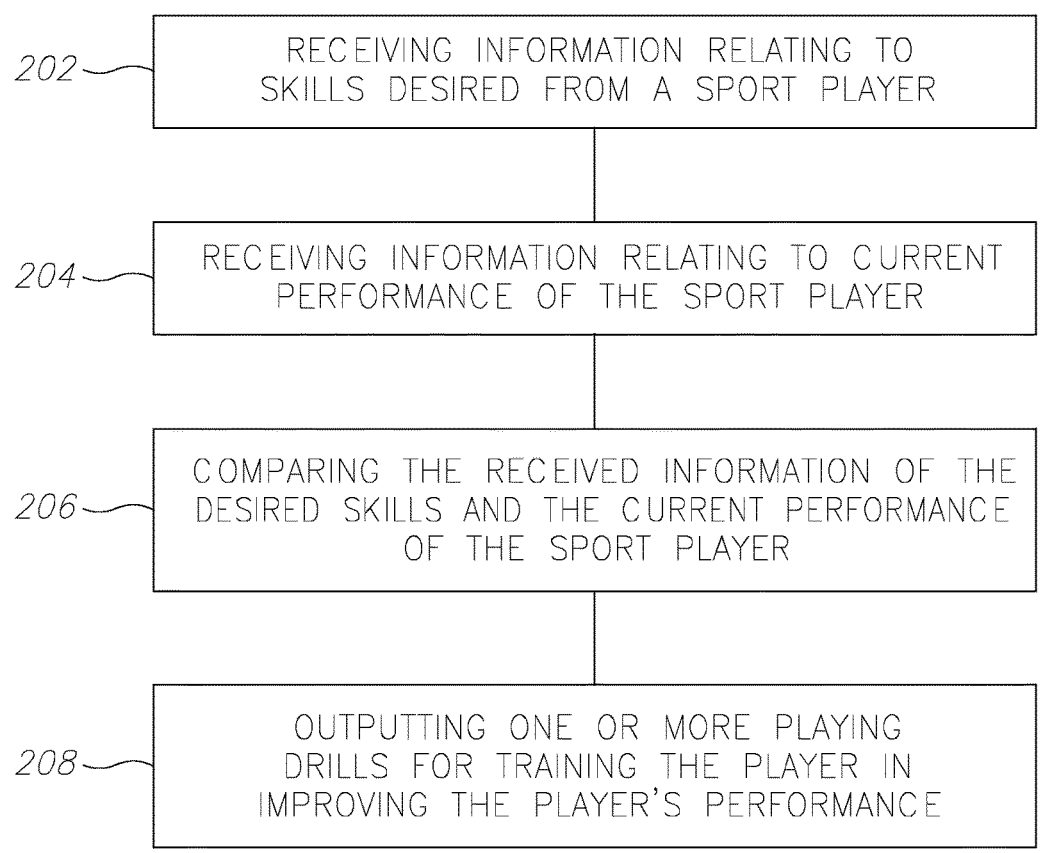
FIG. 6 is a process flow of a method, in accordance with an embodiment of the present technique.

FIG. 6 is a process flow 200 of a method, in accordance with an embodiment of the present technique. Accordingly, the process flow 200 may form one or more software elements, such as those adapted to be executed by a computer and/or storable on a tangible machine readable medium, such as a computer storage device, hard drive and the like. Hence, the process flow may generally run on a central computing unit (CPU) adapted to receive, transfer, process and transmit digital data. The CPU may be connected to other input/output devices, such as monitors, printers, storage devices, keyboards, faxes, scanners, network modems, routers and so forth.

Accordingly, the method 200 is adapted to provide certain training and exercise outputs to coaches and players based on certain inputs associated with information relating to the players performing such training drills.

Accordingly, the process flow includes step 202 in which an input is provided, specifying aspects and/or skills coaches and/or staff members desire to develop in certain players. Such desired skills may include player feet coordination, ball elevation, running with ball, passing, stamina training, ball manipulation and handling techniques used with feet, knees, heads and/or other body portions usually used in the game of soccer. The process flow further includes step 204, whereby input is provided regarding personal information of player(s) for the desired training exercises and/or drills are intended. Such information includes, current and past performance of the player, further including the player's track record in scoring, passing, assisting, running and so forth. Thus, player's information may include certain statistical averages and means relating to the player's athletic and playing abilities, such as running speed, acceleration, kicking distance, turning speed and side ball handling preference, failed goal attempts versus successful goals, player's physical height and weight, breathing and hear rate, as well as other factors indicating the overall skills and playing ability of the player.

Accordingly, at step 206 the process flow compares those attributes specified at step 204 with the skills coaches set out to develop for determining weakness and strengths the player may posses, determining those skill areas a player may need further help with and/or those areas a player may posses satisfactory levels of skills. Hence at step 208, the process flow may output one or more training exercises and drills, such as those illustrated and described by FIGS. 3-5, adapted to strengthen those areas the player needs additional practice, as desired by the coaches.

In embodiments, the invention comprises one or more tangible, machine readable media, comprising computer usable program code executable to perform the acts of: receiving information relating to skills desired from a sport player; receiving information relating to current performance of the sport player; comparing the received information of the desired skills and the current performance of the sport player; and outputting, based on the comparison, one or more playing drills for training the player in improving the player's performance in the sport, wherein the training comprises, displaying on a wearable item, worn by the player, a plurality of colors such that each one of the plurality of colors is displayed on a designated portion of the wearable item, and displaying on each one of a plurality of equipment devices a color that corresponds to each one of the plurality of colors displayed on the wearable item; and wherein each device is adapted to direct the player to perform a specific operation, such that the operation is done with the designated portion of the wearable item. The machine readable media may be embodied as a computer program product that comprises a computer usable medium having the computer usable program code tangibly embodied thereon.

The information relating to the current performance of the player may comprise any one of player running speed, player running acceleration, player kicking distance, player ball handling preference, failed goal attempts versus successful goals per game, player's physical height and weight, breathing and hear rate.

The machine readable media may further comprise code executable to perform the act of generating a training map comprising a layout of equipment devices that is configured to develop the skills of the sport player as given in the information relating to current performance of the sport player to reach the desired skills, wherein the equipment devices are selected and placed according to a plurality of deficits in the current performance in respect to the desired skills.

In embodiments, the invention comprises a system adapted to train a sport player, comprising: at least one wearable item adapted to be worn by the sport player, wherein the at least one wearable item comprises a plurality of colors such that each one of the plurality of colors is displayed on a designated portion of the wearable item; a plurality of equipment devices, wherein each one of the equipment devices comprises a color that corresponds to one of the plurality of colors displayed on the wearable item. Each device may be adapted to direct the player to perform a specific operation, such that the operation is done with the designated portion of the wearable item.

The system may further comprise a camera arranged to record the drill and a image processing software arranged to analyze the recorded drill and generate a training map comprising a layout of equipment devices that is configured to develop skills of the sport player to reach specified desired skills, wherein the equipment devices are selected and placed according to a plurality of deficits identified in the analyzed recorded drill in respect to the specified desired skills.

In embodiments, the system, the method or the machine readable media may monitor the player's performance and design corresponding device layouts to improve deficient skills of the player, according to desired skills specified by a trainer. The image processing software may allow a semi-automatic evaluation and real-time feedback to the player and trainer that may significantly improve the efficiency of the practice.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A system for training a sport player, comprising:
at least one wearable item to be worn by the sport player, the at least one wearable item including a plurality of colors such that each one of the plurality of colors is displayed on a designated portion of the wearable item;
a plurality of equipment devices deployed in various regions across a training field, each one of the equipment devices being spatially separated and independently positioned relative to each of the other equipment devices, each one of the equipment devices including a color that corresponds to one of the plurality of colors displayed on the wearable item, each one of the equipment devices directing the sport player to perform a respective unobstructed physical operation, such that the operation is executed with the designated portion of the wearable item, while advancing a ball between the various regions.

2. The system according to claim 1, wherein the wearable item is a soccer shoe.

3. The system according to claim 1, wherein each one of the equipment devices is selected from the group consisting of: cones, hoops, slabs, balls, domes, and a combination thereof.

4. The system according to claim 1, wherein the operation includes a drill performed by the sport player.

5. The system according to claim 4, further comprising a camera arranged to record the drill and an image processing software arranged to analyze the recorded drill and generate a training map comprising a layout of equipment devices that is configured to develop skills of the sport player to reach specified desired skills, wherein the equipment devices are selected and placed according to a plurality of deficits identified in the analyzed recorded drill in respect to the specified desired skills.

6. The system according to claim 1, wherein the drill is selected from the group consisting of: kicking a ball, running with a ball, elevating a ball, passing a ball, and a combination thereof performed by the sport player.

7. The system according to claim 1, wherein the designated portion displayed on the wearable item matches the color of one of the plurality of equipment devices when the sport player performs the specific operation.

8. The system according to claim 1 wherein each one of the equipment devices is deployed across the training field such that for at least one pair of equipment devices disposed in two different regions of the training field a path is provided to allow the unobstructed advancement of the sport player between the equipment devices of the at least one pair.

9. The system according to claim 1, wherein the plurality of colors includes a combination of any of a black, green, yellow, blue, red, white, purple, pink, burgundy, magenta, cayenne, or any other color available by a visible color spectrum appearing in a rainbow.

10. A method of training a sport player, comprising:
displaying on a wearable item worn by the sport player a plurality of colors such that each one of the plurality of colors is displayed on a designated portion of the wearable item;
deploying a plurality of equipment devices in various regions across a training field; and
displaying on each one of the plurality of equipment devices a color that corresponds to each one of the plurality of colors displayed on the wearable item, each one of the equipment devices being spatially separated and independently positioned relative to each of the other equipment devices, and each one of the plurality of equipment devices to directing the sport player to perform a respective unobstructed operation, such that the operation is executed with the designated portion of the wearable item, while advancing a ball between the various regions.

11. The method according to claim 10, wherein the wearable item is a soccer shoe.

12. The method according to claim 10, wherein each one of the equipment devices is selected from the group consisting of: cones, hoops, slabs, balls, domes, and a combination thereof.

13. The method according to claim 10, wherein the operation includes a drill performed by the sport player.

14. The method according to claim 13, wherein the drill is selected from the group consisting of: kicking a ball, running with a ball, elevating a ball, passing a ball, and a combination thereof performed by the sport player.

15. The method according to claim 10, wherein the designated portion displayed on the wearable item matches the color of one of the plurality of devices when the sport player performs the specific operation.

16. The method according to claim 10, wherein the deploying of the equipment devices includes:
placing, each one of the plurality of equipment devices on different regions of the training field such that for at least one pair of equipment devices disposed in two different regions of the training field a path is provided to allow the unobstructed advancement of the sport player between the equipment devices of the at least one pair.

17. The method according to claim 10, wherein the plurality of colors includes a combination of any of a black, green, yellow, blue, red, white, purple, pink, burgundy, magenta, cayenne, or any other color available by a visible color spectrum appearing in a rainbow.

18. One or more tangible, machine readable media, comprising code executable to perform the acts of:
receiving information relating to skills desired from a sport player;
receiving information relating to current performance of the sport player;
comparing the received information of the desired skills and the current performance of the sport player; and
outputting, based on the comparison, one or more playing drills for training the sport player in improving the performance of the sport player in the sport,
wherein the training comprises, displaying on a wearable item, worn by the sport player, a plurality of colors such that each one of the plurality of colors is displayed on a designated portion of the wearable item, deploying a plurality of equipment devices in various regions across a training field, and displaying on each one of the plurality of equipment devices a color that corresponds to each one of the plurality of colors displayed on the wearable item, each one of the equipment devices being spatially separated and independently positioned relative to each of the other equipment devices, and each one of the equipment devices to directing the sport player to perform a respective unobstructed operation, such that the operation is executed with the designated portion of the wearable item, while advancing a ball between the various regions.

19. The machine readable media according to claim 18, wherein the information relating to the current performance of the sport player includes any one of sport player running speed, sport player running acceleration, sport player kicking distance, sport player ball handling preference, failed goal attempts versus successful goals per game, sport player physical height and weight, breathing and hear rate.

20. The machine readable media according to claim 18, wherein the equipment devices are configured to be placed on a field.

21. The machine readable media according to claim 18, wherein the operation includes physically moving a soccer ball with designated portion of the wearable item.

22. The machine readable media according to claim 18, further comprising code executable to perform the act of generating a training map comprising a layout of equipment devices that is configured to develop the skills of the sport player as given in the information relating to current performance of the sport player to reach the desired skills, wherein the equipment devices are selected and placed according to a plurality of deficits in the current performance in respect to the desired skills.

* * * * *